US007220947B2

(12) United States Patent
Cardenas et al.

(10) Patent No.: US 7,220,947 B2
(45) Date of Patent: May 22, 2007

(54) PIPE HEATER

(75) Inventors: Carlos A. Cardenas, North Granby, CT (US); Matthew T. Byrne, South Windsor, CT (US)

(73) Assignee: Global Heating Solutions, Inc., Allegan, MI (US)

(*) Notice: Subject to any disclaimer, the term of this patent is extended or adjusted under 35 U.S.C. 154(b) by 0 days.

(21) Appl. No.: 11/241,529

(22) Filed: Sep. 30, 2005

(65) Prior Publication Data

US 2007/0075071 A1 Apr. 5, 2007

(51) Int. Cl.
*H05B 3/34* (2006.01)
*F16L 53/00* (2006.01)

(52) U.S. Cl. .......................... 219/549; 138/33; 285/41

(58) Field of Classification Search ................ 219/549, 219/538, 548, 547, 528, 529, 591, 535; 138/33, 138/35; 285/41

See application file for complete search history.

(56) References Cited

U.S. PATENT DOCUMENTS

| | | | |
|---|---|---|---|
| 2,617,916 | A | 11/1952 | Neidnig |
| 2,679,569 | A | 5/1954 | Hall |
| 2,683,673 | A | 7/1954 | Silversher |
| 2,715,668 | A | 8/1955 | Booker et al. |
| 2,719,907 | A | 10/1955 | Combs |
| 2,825,702 | A | 3/1958 | Silversher |
| 3,049,465 | A | 8/1962 | Wilkins |
| 3,305,668 | A | 2/1967 | Smith |
| 3,454,747 | A | 7/1969 | Hart |
| 3,757,086 | A | 9/1973 | Indoe |
| 3,851,149 | A | 11/1974 | Daley |
| 4,032,380 | A | 6/1977 | Olsson |
| 4,362,684 | A | 12/1982 | Thalmann |
| 4,363,947 | A | 12/1982 | Bergersen |
| 4,436,988 | A | 3/1984 | Blumenkranz |
| 4,441,017 | A | 4/1984 | Sorlien |

(Continued)

FOREIGN PATENT DOCUMENTS

DE 1804649 5/1970

(Continued)

OTHER PUBLICATIONS

Watlow Electric Heaters & Control, St. Louis, MO., Heaters, Sensors & Controls, Product Brochure on Flexible Heaters, 12 pages, date unknown.

(Continued)

*Primary Examiner*—Daniel Robinson
(74) *Attorney, Agent, or Firm*—Price, Heneveld, Cooper, DeWitt & Litton, LLP

(57) ABSTRACT

A heater for heating elongated objects includes an elongated strip of flexible material having first and second ends and elongated opposite side edges defining a width therebetween. The strip of material comprises a fiber reinforced elastomeric material having at least a first portion that is set in a spiral. The heater also includes at least one elongated electrically conductive heating element imbedded in the elongated strip of elastomeric material. A thermostat is operably coupled to the heating element, and the thermostat is encapsulated in an elastomeric dielectric material that is bonded to the elastomeric material of the strip to provide a waterproof seal around the thermostat. The heater further includes an electrical power line extending from the thermostat for supplying power to the heater.

13 Claims, 4 Drawing Sheets

U.S. PATENT DOCUMENTS

| | | | | |
|---|---|---|---|---|
| 4,547,655 | A | 10/1985 | Kurata et al. | |
| 4,575,617 | A | 3/1986 | Cooper | |
| 4,695,703 | A * | 9/1987 | Williams et al. | 219/212 |
| 4,792,663 | A | 12/1988 | Kishimoto et al. | |
| 5,017,760 | A * | 5/1991 | Miller | 219/390 |
| 5,213,750 | A | 5/1993 | Knapp et al. | |
| 5,286,952 | A | 2/1994 | McMills et al. | |
| 5,294,973 | A * | 3/1994 | Byrne | 356/625 |
| 5,389,184 | A | 2/1995 | Jacaruso et al. | |
| 5,394,507 | A | 2/1995 | Okamoto | |
| 5,512,732 | A * | 4/1996 | Yagnik et al. | 219/549 |
| 5,521,358 | A | 5/1996 | Eilentropp | |
| 5,586,214 | A | 12/1996 | Eckman | |
| 5,818,012 | A | 10/1998 | Maniero | |
| 5,910,266 | A | 6/1999 | Jones | |
| 6,393,213 | B1 * | 5/2002 | Bresolin | 392/498 |
| 6,403,935 | B2 * | 6/2002 | Kochman et al. | 219/545 |
| 6,539,171 | B2 | 3/2003 | VonArx et al. | |
| 6,958,463 | B1 * | 10/2005 | Kochman et al. | 219/544 |
| 2001/0025846 | A1 * | 10/2001 | Kochman et al. | 219/545 |
| 2002/0040898 | A1 | 4/2002 | Von Arx et al. | |
| 2005/0247700 | A1 * | 11/2005 | Kochman et al. | 219/544 |

FOREIGN PATENT DOCUMENTS

| | | |
|---|---|---|
| DE | 2354703 | 12/1974 |
| FR | 1448060 | 6/1966 |
| GB | 904828 | 8/1962 |

OTHER PUBLICATIONS

Watlow Electric Heaters & Control, St. Louis, MO., Product Brochure on Silicone Rubber Heaters, 3 pages, date unknown.

Electrofilm Mfg. Co., Valencia, CA., Product Brochure on Heating Elements, 6 pages. Thomas Register, date unknown.

* cited by examiner

PIPE HEATER

BACKGROUND OF THE INVENTION

Various heaters have been developed for heating pipes, tubes, conduits and the like. Pipe heaters may be used to heat a water pipe in a house or building to prevent freezing of water in the pipe when the temperature drops below freezing. Also, such heaters may be utilized to heat various conduits or other lines in aircraft or the like that are exposed to low temperatures at high altitudes. Furthermore, such heaters may be utilized to heat pipes, conduits, or the like that are utilized in chemical processing and refining operations and the like.

A known type of heater for such applications comprises an elongated flat tape-like heating element that is wrapped around the pipe, rod or other such structure that is to be heated. Such heaters may be prone to unwinding from the pipe, and may not maintain solid contact between the heater and the pipe along the length of the heater, thereby reducing the effectiveness of the heater.

SUMMARY OF THE INVENTION

One aspect of the present invention is a heater for heating elongated objects including an elongated strip of flexible dielectric material having first and second ends and elongated opposite side edges defining a width therebetween. The elongated strip of flexible dielectric material also has inner and outer faces defining a thickness therebetween and extending between the opposite side edges. The strip of dielectric material comprises a fiber reinforced dielectric elastomeric material having at least a first portion that is set in a spiral with the inner face facing inwardly, and the outer face facing outwardly. The heater also includes at least one elongated electrically conductive heating element imbedded in the elongated strip of dielectric material. A thermostat is operably coupled to the heating element, and the thermostat is encapsulated in an elastomeric dielectric material that is bonded to the dielectric elastomeric material of the strip of dielectric material. The heater further includes an electrical power line extending from the thermostat for supplying power to the heater.

Another aspect of the present invention is a heater for heating elongated objects including an elongated strip of flexible dielectric material having first and second ends and a first portion having first opposite side edge portions defining a first centerline and a first width therebetween. The elongated strip further defines inner and outer faces extending between the first opposite side edge portions. The first portion of the strip of dielectric material includes a spiral with the inner face facing inwardly and the outer face facing outwardly. The first end defines an end portion having a second side having second side edge portions and defining a second centerline between the second side edge portions. The end portion is angled relative to the first portion, and the first centerline is disposed at an angle of between zero and ninety degrees relative to the second centerline.

Yet another aspect of the present invention is a method of forming a heater for elongated objects. The method includes providing an elongated strip of heat curable elastomeric material, and an elongated mandrel having a smooth, continuous cylindrical outer surface. The elongated strip is wrapped around the mandrel to form a spiral, and the elongated strip is heated to set the elongated strip in a spiral shape.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a fragmentary view showing the heater being wrapped on a pipe or the like;

DETAILED DESCRIPTION OF PREFERRED EMBODIMENT

Figures 1, 2:
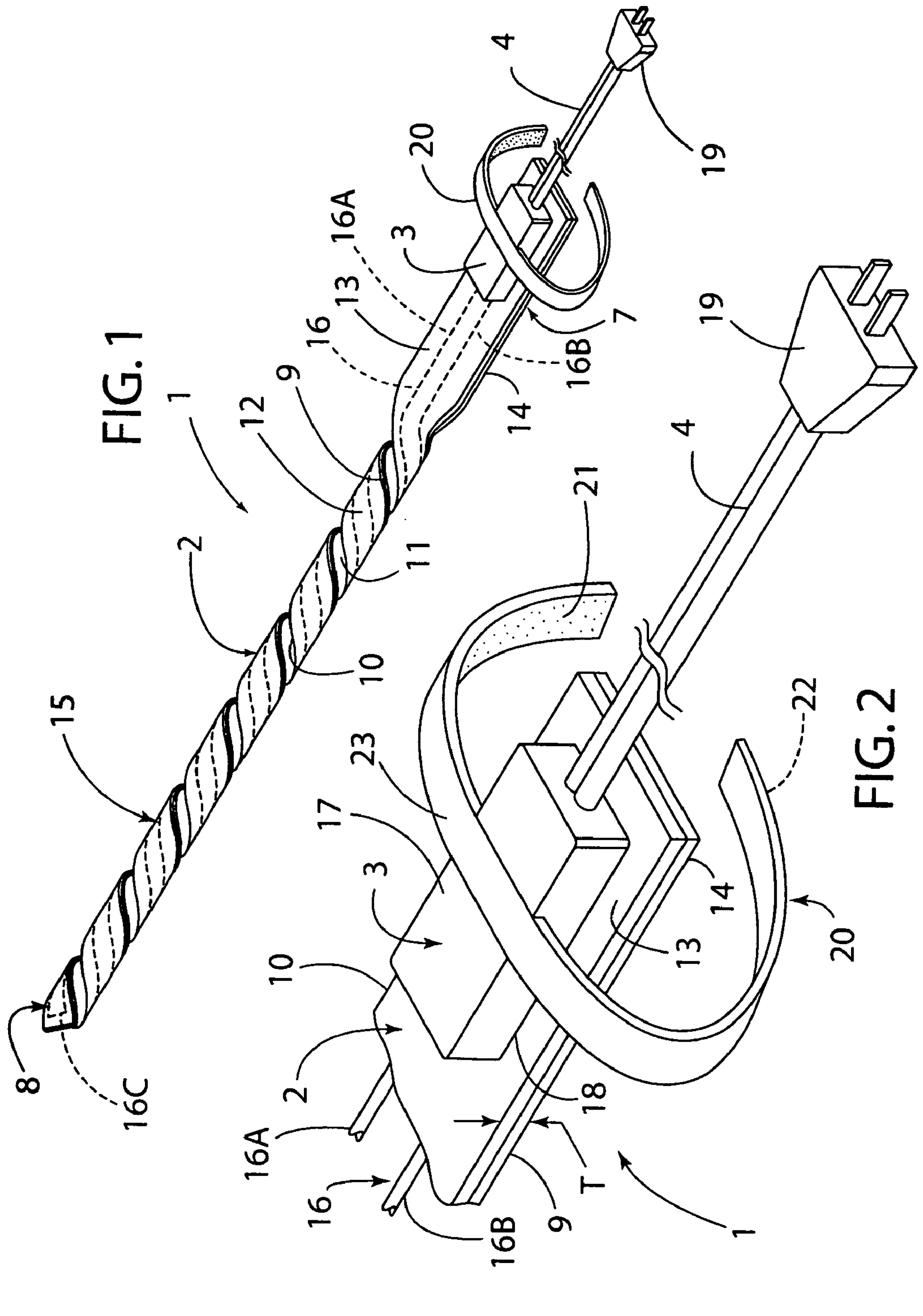
FIG. 1 is a perspective view of a heater according to one aspect of the present invention.
FIG. 2 is a fragmentary, enlarged view of a portion of the heater of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a heater 1 according to one aspect of the present invention includes an elongated strip of flexible dielectric material 2 having a first end 7 and a second end 8 and elongated opposite side edges 9 and 10 defining a width W1 (see also FIG. 3) therebetween. The elongated strip 2 defines a thickness T (FIG. 2) between an inner face 11 and an outer face 12. The inner and outer faces 11 and 12 extend between the opposite side edges 9 and 10. As discussed in more detail below, the elongated strip of dielectric material 2 may include a first layer 13 that includes fiberglass reinforcing fibers, and an elastomeric matrix such as a silicone rubber material. The elongated strip 2 may also include a layer 14 of silicone rubber or other suitable elastomeric material that does not include fiber reinforcement.

The elongated strip 2 of flexible dielectric material includes at least a first portion 15 that is set in a spiral with the inner face 11 facing inwardly, and the outer face 12 facing outwardly. At least one elongated electrically conductive heating element such as wire 16 is imbedded in the elongated strip 2 of dielectric material. The wire 16 includes a first portion 16A and a second 16B that are generally parallel to one another, with an end portion 16C interconnecting the wire portions 16A and 16B. The wire portions 16A and 16B are electrically coupled to a thermostat 3 that is encapsulated in a layer of elastomeric material 17. The elastomeric material 17 is similar to the elastomeric material of layers 13, 14, and the elastomeric material 17 tightly bonds to the first layer 13 to form a water-tight seal at the junction 18 where the elastomeric material 17 is bonded to the first layer 13. An electrical power line 4 is operably connected to the thermostat 3, and includes a conventional plug 19 for supplying power to the heater 1.

With reference to FIG. 2, a flexible strap 20 includes hook-and-loop fastening surfaces 21 and 22. A central portion 23 of strap 20 is imbedded in elastomeric material 17 to thereby secure the strap 20 to the elastomeric material 17 and thermostat 3. When the heater 1 is installed on a pipe 25 or the like (FIG. 3), the strap 20 is wrapped around the pipe 25, and securely holds the end 7 of heater 1 in position.

Figure 3:
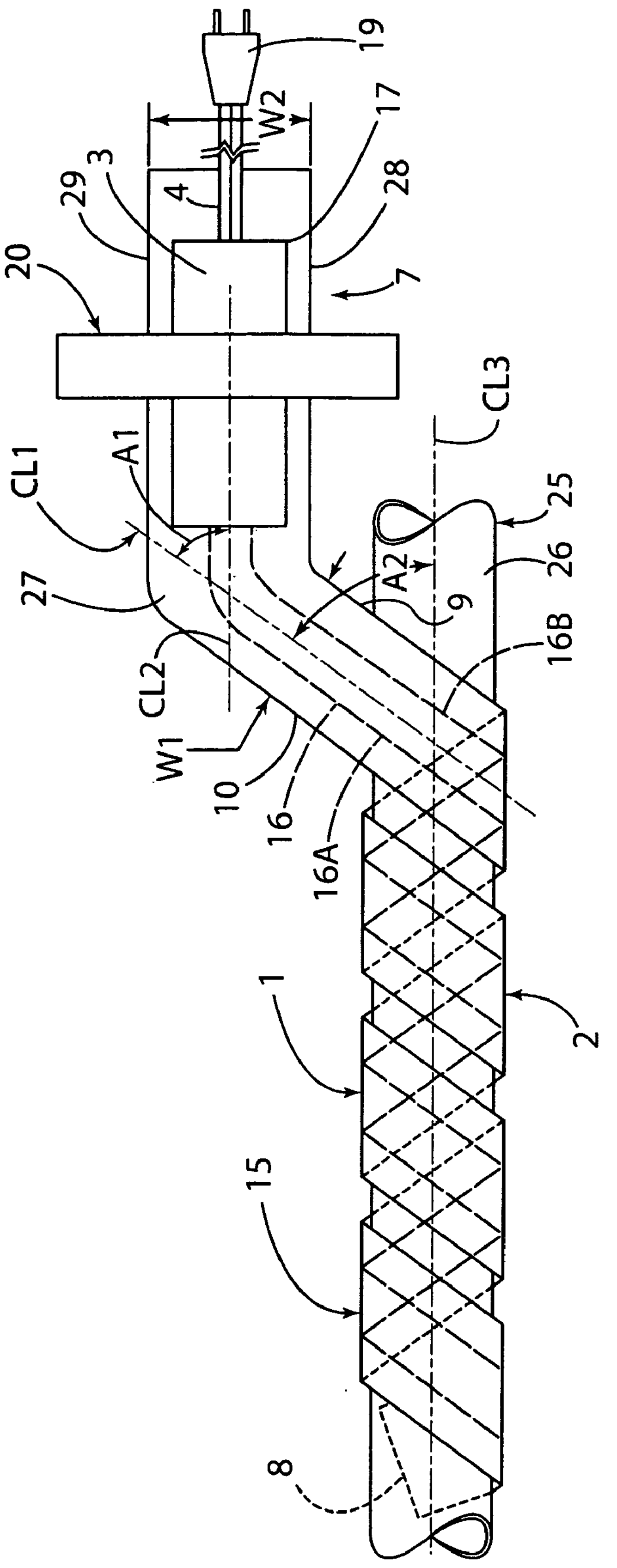

With reference to FIG. 3, the elongated strip 2 defines opposite side edges 9 and 10 defining a width W1, and a first centerline CL1. The end 7 of elongated strip 2 includes an end portion 27 having opposite side edges 28 and 29 that define a width W2 and a second centerline CL2. In the illustrated example, the width W2 is substantially greater than the width W1. More specifically, in the illustrated example the width W1 is about 1.00 inches, and the width W2 is about 1.25 inches. The greater width end portion 27 provides additional space for mounting of thermostat 3, and the narrower width W1 permits closer spacing of the heating wire sections 16A and 16B for each loop of the spiral. In the illustrated example, the angle "A1" between centerline CL1 and centerline CL2 is between 0° and 90°, and preferably about 30°. The angle A1 is chosen to generally align the centerline CL2 with the centerline of the spiraled first portion 15 CL3. Because the thermostat 3 is substantially longer than it is wide, the angle of the end portion 27 relative to spiraled first portion 15 permits the end 27 and thermostat 3 to fit closely against the outer surface 26 of pipe 25 or other such item to be heated. In the illustrated example, the angle A2 formed by the spiraled first portion 15 is equal to the angle A1 to thereby align the centerline CL2 of end portion 27 with the centerline CL3 of spiraled first portion 15 and pipe 25.

With reference to FIG. 3, the heater 1 may be installed to a pipe 25 or the like by positioning end 8 of elongated strip 2 against the outer surface 26 of pipe 25. The spiraled first portion 15 of elongated strip 2 can then be wound around the pipe 25, and the end 7 is then securely positioned on the pipe 25 utilizing strap 20. Because the first portion 15 of elongated strip 2 is set in a spiral shape, the first portion 15 of elongated strip 2 will remain tightly wound around the pipe 25. In general, the first portion 15 may be set in a spiral that is smaller in diameter than pipe 25, such that the first portion 15 remains tightly wound on pipe 25. Because the elastomeric material of elongated strip 2 is flexible, the heater 1 may be wound around a pipe 25 or other conduit or part having a range of sizes.

Figure 4:
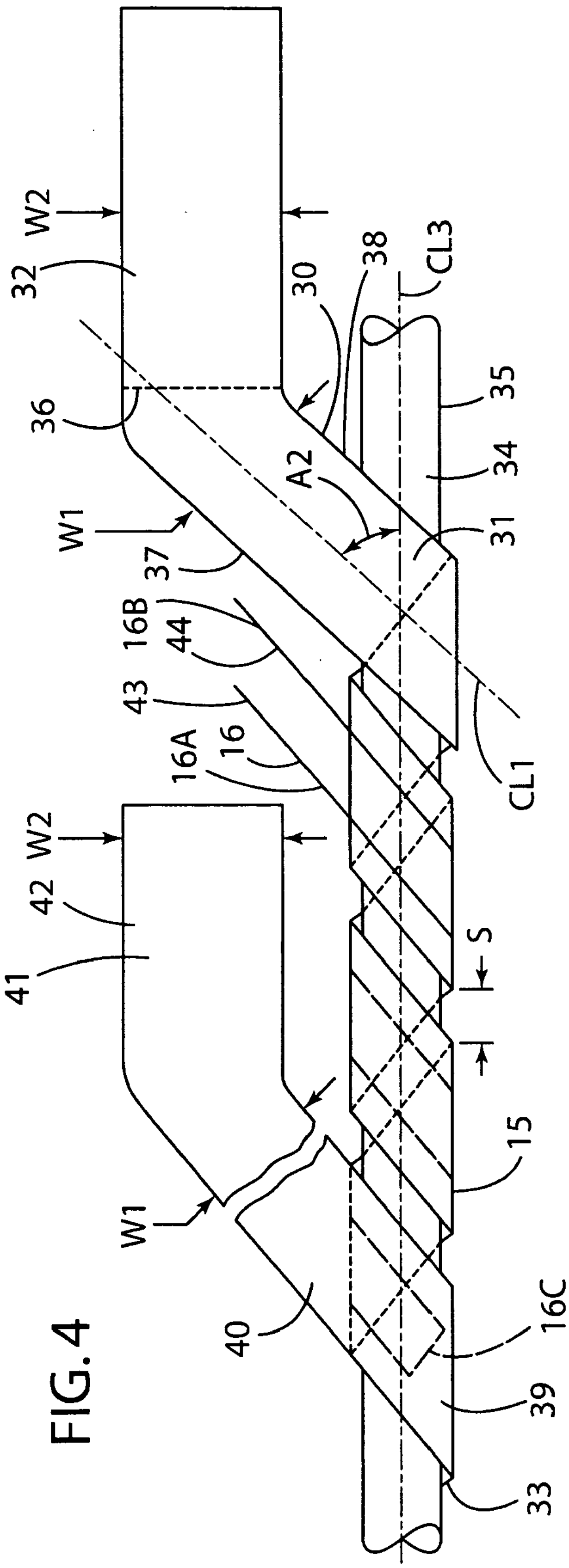
FIG. 4 shows a strip of uncured elastomeric material being wrapped on a mandrel having a smooth cylindrical outer surface.

With further reference to FIG. 4, during fabrication, a strip 30 of uncured elastomeric material is cut from a flat sheet. The material is cut to provide a first portion 31 having a width W1, and a second portion 32 having a width W2. End 33 of strip 30 is then positioned against outer surface 34 of a cylindrical mandrel 35, and the first portion 31 of strip 30 is wrapped around mandrel 35 at an angle A2. The first portion 1 is wrapped on the mandrel 35 until around line 36 forming the intersection between second portion 32 and first portion 31, such that the second portion 32 remains generally flat. Alternately, the entire strip 30 may be wrapped around mandrel 35, including second portion 32. The gap or spacing "S" between opposite edges 37 and 38 of first portion 31 of strip 30 is approximately uniform throughout the spiraled first portion 15. The outer surface 34 of mandrel 35 is a smooth, continuous cylindrical surface without raised spiral portions or the like. Thus, the spacing S and spiral angle A2 may be readily varied and set at a desired value by simply wrapping the strip 30 of uncured material at the desired spiral angle.

After the strip 30 is secured to the mandrel 35, the heating wire 16 is wrapped around outer surface 39 of strip 30 to form an elongated loop having parallel portions 16A and 16B, and an end portion 16C. After the heating wire 16 is wrapped around strip 30, a second strip 40 of uncured material having substantially the same dimensions and shape as strip 30 is wrapped around mandrel 35 on top of heating wire 16 and uncured strip 30. End portion 42 of strip 40 may include one or more openings 41. After the strip 40 is wrapped around strip 30, ends 43 and 44 of wire sections 16A and 16B, respectively, may be fed through opening 41, such that the ends 43 and 44 remain exposed after end portion 42 of strip 40 is positioned on end portion 32 of strip 30. Alternately, if one or more openings 41 are not cut in strip 40, the ends 43 and 44 of wire 16 may simply be pushed through strip 40 at a central portion of end portion 42 of strip 40 to thereby expose the ends 43 and 44 of heating wire 16. In a preferred embodiment, at least one of the strips 30 or 40 includes fiberglass reinforcement or the like imbedded in a matrix of silicone rubber elastomer, and the other strip comprises a sheet of uncured silicone rubber elastomer.

After the strips 30 and 40 and the heating wire 16 are secured to the mandrel 35, the assembly is placed in an autoclave and heated to cure the strips 30 and 40. During the curing process, the elastomeric material of strips 30 and 40 bonds together to form elongated strip 2.

Figure 5:
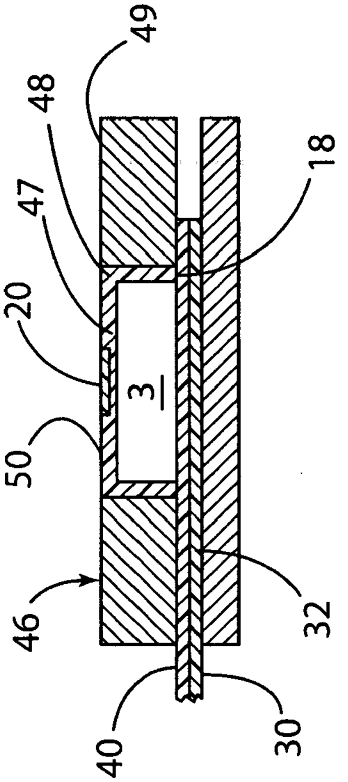
FIG. 5 is a partially schematic cross-sectional view of a mold utilized to encapsulate the thermostat with elastomeric material.

After the first and second strips 30 and 40 are cured in the autoclave to form a first spiraled portion 15, the strip 2 is removed from the mandrel 35, and thermostat 3 is soldered to the ends 43 and 44 of heating wire 16. The thermostat 3 is electrically connected to the ends 43 and 44 of wire 16 utilizing solder or the like. With further reference to FIG. 5, the thermostat 3 and end 32 of elongated strip 2 are positioned in a mold tool 46. The thermostat 3 is positioned within cavity 47 of mold 46, and uncured room temperature vulcanizing (RTV) elastomeric material 48 is poured into the cavity 47 around thermostat 3. Cavity 47 is open along a top side 49, such that the upper surface 50 of the RTV material is exposed. Prior to cure of the RTV material 48, strap 20 is pressed into the upper surface 50 of the RTV material 48. The strap 20 becomes securely bonded to the thermostat 3 as RTV material 48 cures. When the RTV material 48 cures, it forms a water-tight bond at the junction 18 with elastomeric strip 40 to thereby provide a waterproof seal around thermostat 3. The RTV material 48 also securely bonds the thermostat 3 to strip 2.

Figure 6:
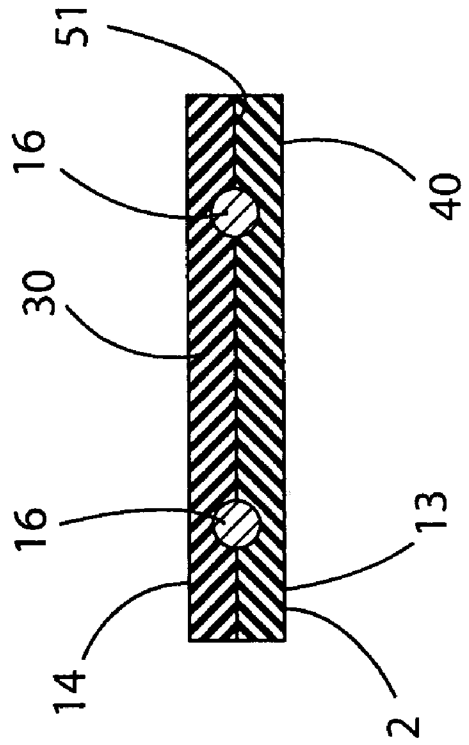
FIG. 6 is a cross-sectional view of a portion of the heater according to one aspect of the present invention.
Figure 7:
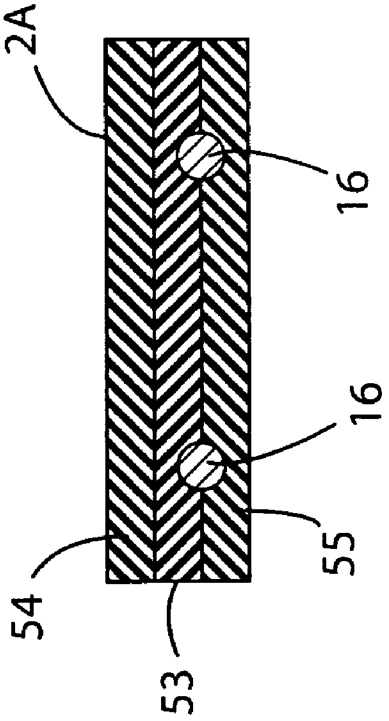
FIG. 7 is a cross-sectional view of a portion of the heater according to another aspect of the present invention.

A variety of elastomeric materials may be utilized to form the spiraled first portion 15 of strip 2. With reference to FIG. 6, the elongated strip 2 may include a strip of silicone elastomeric material 30, and a strip of material 40 having a silicone rubber matrix and fiber glass reinforcement that provides additional strength, while still permitting flexibility. As discussed above, the heating wire 16 is imbedded in the elongated strip 2 between the layers 30 and 40. When cured, the layers 30 and 40 intermix, such that a distinct dividing line 51 between the layers 30 and 40 is no longer present. Another example of an elongated strip 2A according to another aspect of the present invention is illustrated in FIG. 7. The elongated strip 2A includes a middle layer 53 including fiber glass reinforcement fibers, a silicone rubber upper layer 54, and a silicone rubber lower layer 55.

Numerous other combinations of layers are also contemplated by the present invention, such that the examples illustrated in FIGS. 6 and 7 are for purposes of illustration only, and are not intended to limit the scope of the present invention.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A heater for heating elongated objects, comprising:

an elongated strip of flexible dielectric material having first and second ends and elongated opposite side edges defining a width therebetween, and inner and outer faces defining a thickness therebetween and extending between the opposite side edges, the strip of dielectric material comprising a fiber reinforced dielectric elastomeric material having at least a first portion that is set in a spiral with the inner face facing inwardly and the outer face facing outwardly;

at least one elongated electrically conductive heating element imbedded in the elongated strip of dielectric material;

a thermostat operably coupled to the heating element, wherein the thermostat is encapsulated in an elastomeric dielectric material that is bonded to the dielectric elastomeric material of the strip of dielectric material; and an electrical power line extending from the thermostat for supplying power to the heater.

2. The heater of claim 1, wherein:

the opposite side edges comprise first side edge portions;

the first portion of the elongated strip of material defines a first centerline between the first side edge portions, the first end defining an end portion having second side edge portions and defining a second centerline between the second side edge portions; and the first centerline forms an angle relative to the second centerline that is between zero and ninety degrees.

3. The heater of claim 2, wherein:

the first side edge portions define a first width therebetween, and the second side edge portions define a second width therebetween that is substantially greater than the first width.

4. The heater of claim 3, wherein:

the first width is about 1.00 inch, and the second width is about 1.25 inches.

5. The heater of claim 2, wherein:

the angle is about thirty degrees.

6. The heater of claim 1, wherein:

the opposite side edges are parallel to one another.

7. The heater of claim 1, wherein:

the thickness of the elongated strip of material is generally uniform.

8. The heater of claim 1, including:

a hook and loop type strap secured to the heater adjacent the first end of the elongated strip of dielectric material.

9. The heater of claim 8, wherein:

a portion of the strap is imbedded into the elastomeric material encapsulating the thermostat.

10. A method of forming a heater for elongated objects, comprising:

providing an elongated electrically conductive heating element;

providing a thermostat;

operably connecting the electrically conductive heating element to the thermostat;

providing an elongated strip of heat curable elastomeric material;

providing an elongated mandrel having a smooth, continuous cylindrical outer surface;

wrapping the elongated strip around the mandrel to form a spiral;

encapsulating the thermostat in an elastomeric material that is substantially contiguous with the elastomeric material of the strip; and heating the elongated strip of heat curable elastomeric material to set the elongated strip in a spiral shape with the elongated electrically conductive heating element at least partially embedded in the elongated strip of elastomeric material.

11. The method of claim 10, wherein:

the elastomeric material comprises silicone.

12. The method of claim 10, wherein:

the elongated strip comprises a first elongated strip; and including:

providing a second elongated strip of heat curable elastomeric material;

providing an elongated electrically conductive heating element;

wrapping the electrically conductive heating element on top of the first elongated strip;

wrapping the second elongated strip on top of the heating element;

heating the first and second elongated strips to cure the strips and encapsulate the heating element.

13. The method of claim 12, including:

providing a flexible strap including a hook and loop type fastener; and imbedding a portion of the strap in the elastic material encapsulating the thermostat.

* * * * *